Patented May 21, 1940

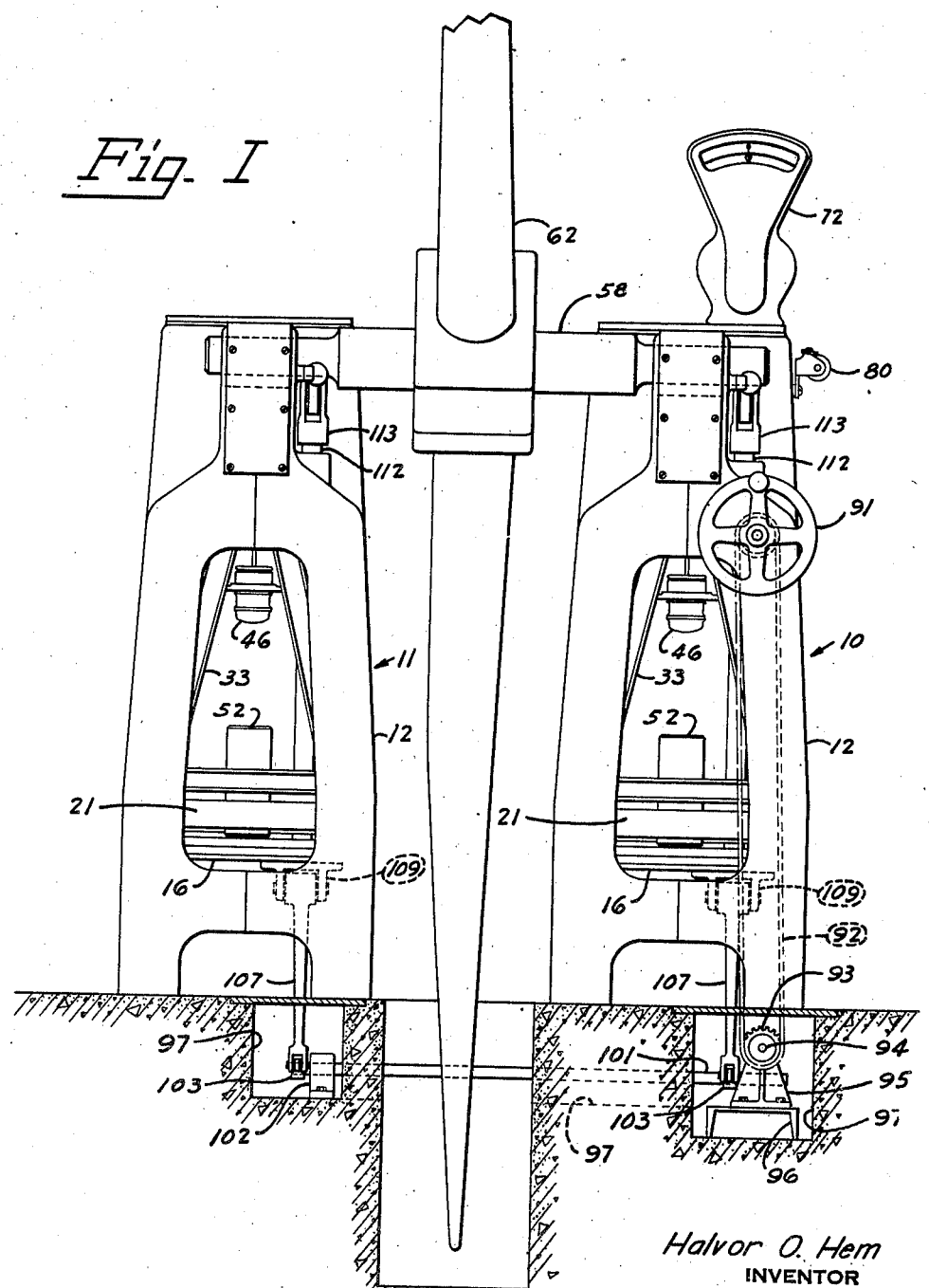

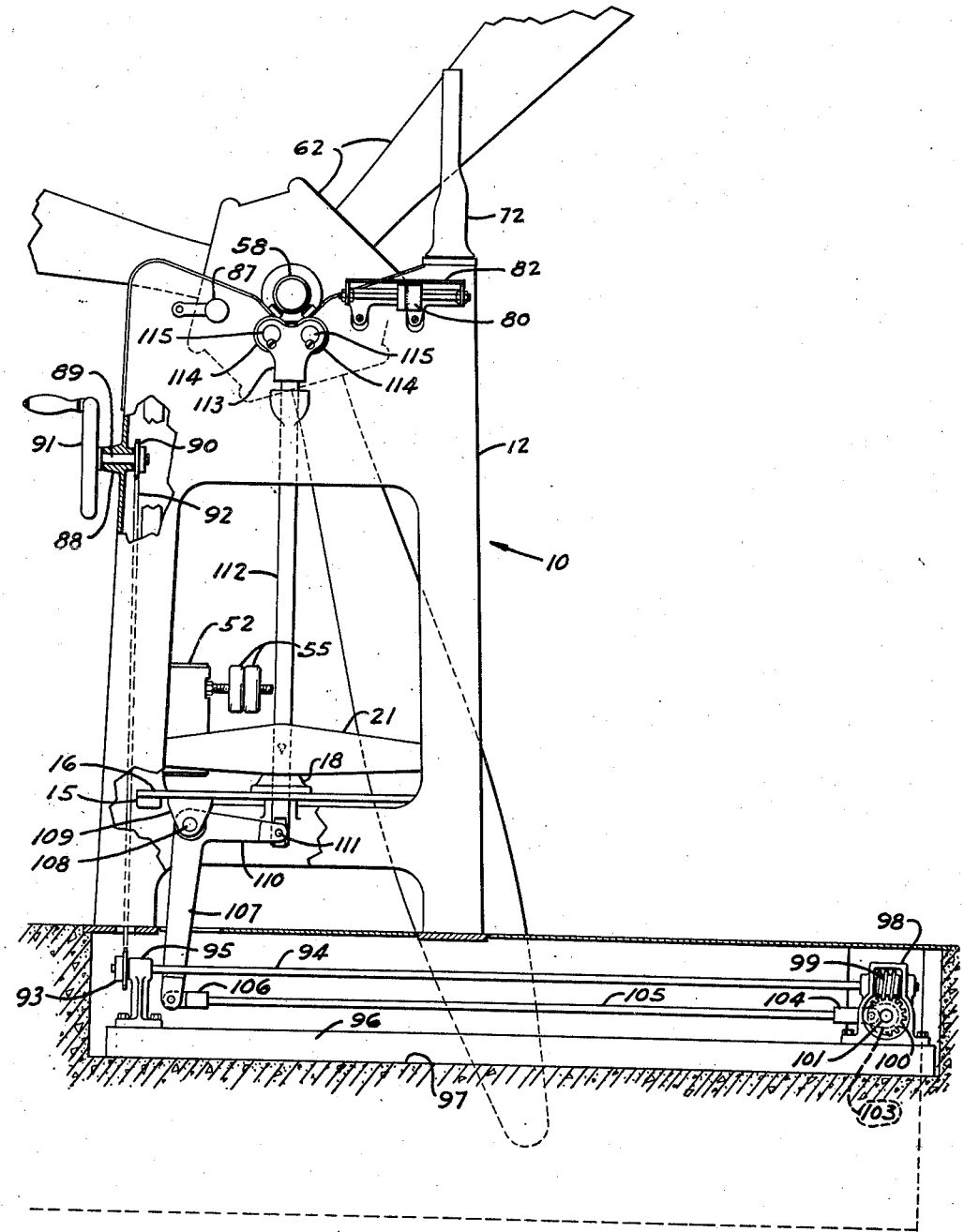

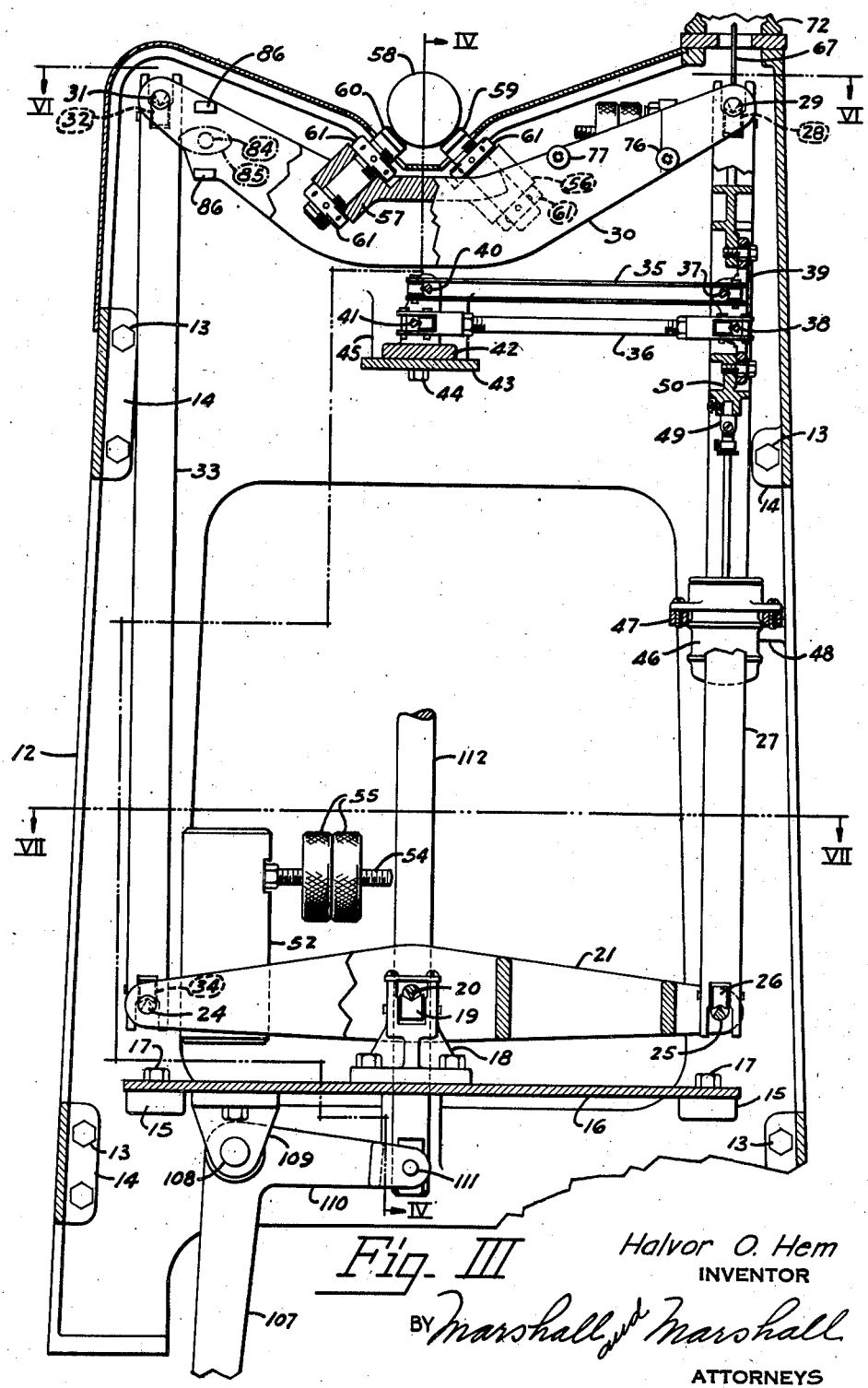

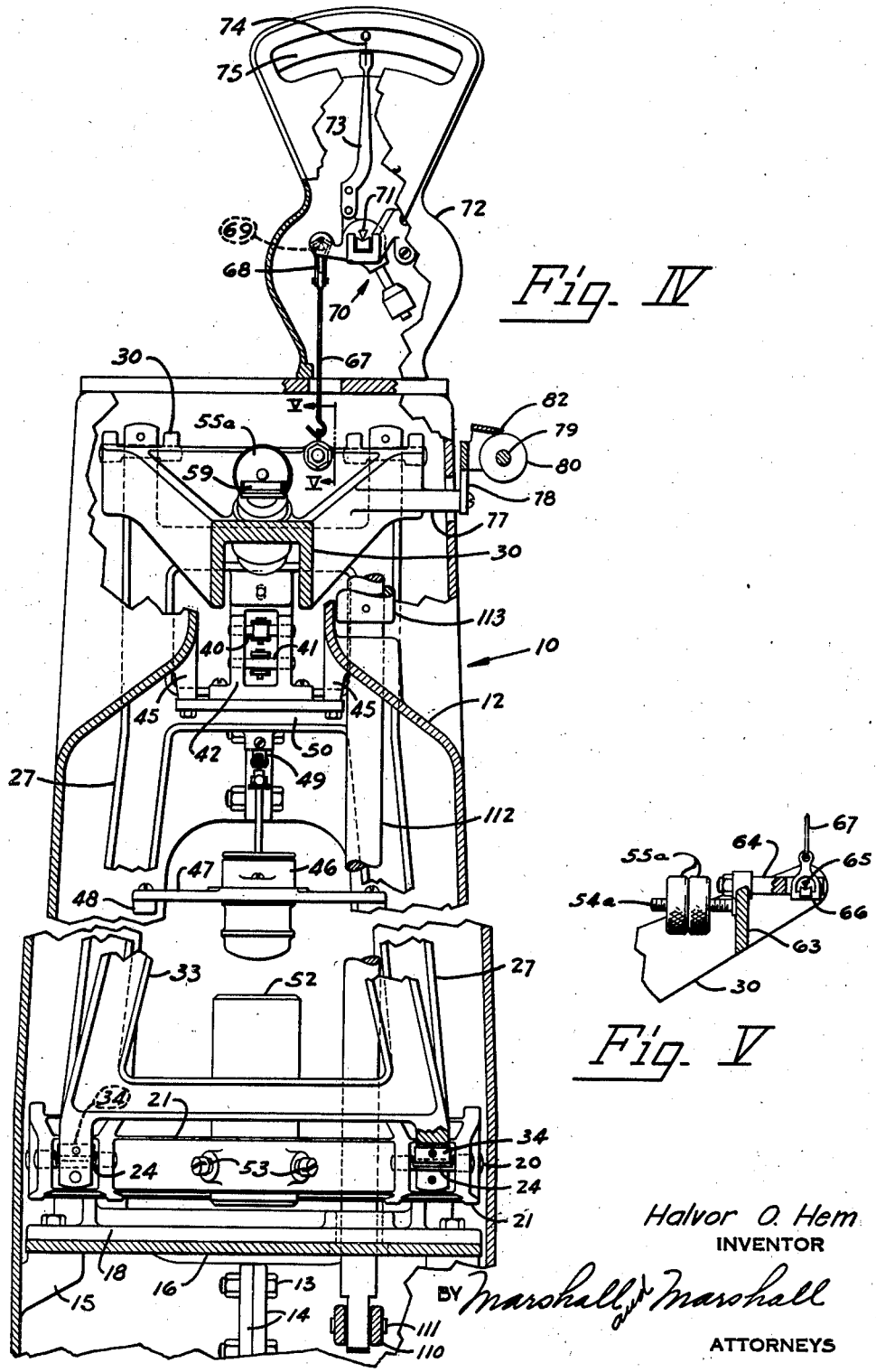

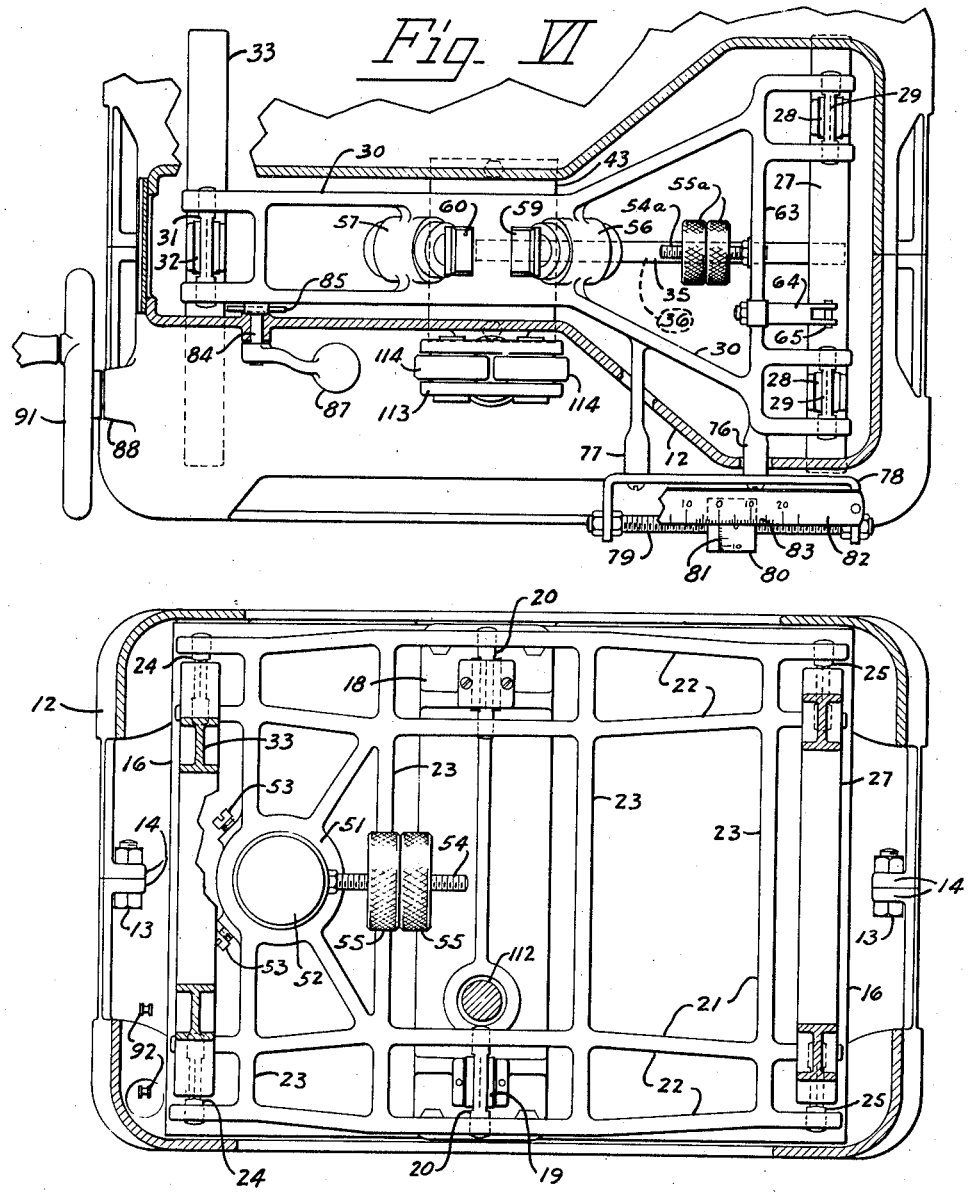

2,201,369

UNITED STATES PATENT OFFICE 2,201,369

TESTING DEVICE

Halvor O. Hem, Toledo, Ohio, assignor to Toledo Scale Manufacturing Company, Toledo, Ohio, a corporation of New Jersey Application November 3, 1938, Serial No. 238,593

9 Claims. (Cl. 73—53)

This invention relates generally to testing devices, and more particularly to devices for testing and/or statically balancing an assembled airplane propeller.

The principal object of the invention is the provision of an improved balancing device adapted to support an assembled propeller and to automatically indicate a condition of unbalance.

Another object is the provision of an improved balancing device wherein each end of a mandrel extending through the hub of an assembled airplane propeller is supported upon similar independent mechanisms.

Another object is the provision of an improved static balance testing device in which means are provided for quantitatively determining a condition of unbalance; and, Another object is the provision of improved means in a device of the class described in which means are provided whereby an assembled propeller may be readily lifted from the testing means so that it may be rotated without causing forces to react on the mechanism.

These, and other objects and advantages will be apparent from the following description in which reference is had to the accompanying drawings, illustrating a preferred embodiment of the invention and in which similar reference numerals refer to similar parts throughout the several views.

Referring to the drawings:

Fig. I is a front elevational view of a propeller balancing device embodying the invention.

Fig. II is a side elevational view thereof.

Fig. III is an enlarged side elevational view of one of the supporting stands, the frame being sectioned and parts broken away to more clearly show the operative relation of the parts.

Fig. IV is an enlarged sectional view through one of the supporting stands, it being sectioned substantially along the line IV—IV of Fig. III.

Fig. V is an enlarged fragmentary sectional view substantially along the line V—V of Fig. IV.

Fig. VI is a plan sectional view substantially along the line VI—VI of Fig. III; and, Fig. VII is a similar sectional view substantially along the line VII—VII of Fig. III.

Referring to the drawings in detail:

The device comprises two similar propeller supporting stands 10 and 11, which are preferably mounted on a rigid concrete floor in aligned but spaced relation to each other. Each of these stands comprises a frame 12 which is composed of two sections that are secured to each other by bolts 13 passing freely through inwardly extending bosses 14. Other bosses 15, which project inwardly in a horizontal plane near the lower end of the frame, support a relatively stiff plate 16 fastened to the bosses 15 by means of bolts 17. This plate 16 has mounted thereon a fulcrum stand 18 which, by means of suitable alignable bearings 19, rockably supports fulcrum pivots 20 of a beam 21. This beam 21 comprises a plurality of pairs of longitudinally extending arms 22 and a plurality of transversely extending arms 23. The fulcrum pivots 20, which comprise a conical body, are driven in taper-reamed holes collinearly located in each pair of the parallel longitudinally extending arms 22 substantially in the center of the beam and similar pivots 24 and 25 span the space between the pairs of arms 22 at their ends (Fig. VII). The pivots 25, whose knife edges point in the direction opposite to that of the fulcrum pivots 20 (Fig. III) support hardened V bearing blocks 26 rockably mounted in the lower bifurcated ends of a vertically positioned supporting frame 27. Similar hardened V bearings 28 in the upper ends of the frame support downwardly turned knife edge pivots 29 which are fixed in spaced arms of a mandrel supporting cradle 30 (Fig. VI). The opposite end of this cradle is provided with a single pivot 31 positioned on the longitudinal axis which engages a bearing 32 in the upper end of a substantially triangular vertically positioned frame 33, whose lower end is provided with spaced bearings 34 which rest upon the knife edges of the pivots 24 in the beam 21. This frame is substantially triangular in shape with its single upper bearing on the longitudinal axis midway between the two spaced lower bearings 34 so as to result in a stable support for the mandrel receiving cradle 30.

To maintain the vertical position of the frames 27 and 33, and the cradle 30 mounted thereon, check links 35 and 36 are provided, which extend between pivots 37 and 38, disposed horizontally on a plate 39 adjustably secured to the frame 27, and pivots 40 and 41 horizontally fixed in a bracket 42 mounted upon a plate 43 which is secured by means of bolts 44 to bosses 45 which extend downwardly from converging walls of the frame 12. The check link 35 is a "pull" member and the check link 36 is a "push" member of known construction and cooperate to parallelly guide the mandrel receiving cradle 30 so that it rocks through the same angle as the beam 21 on which it is pivotally supported by the frames 27 and 33.

For the purpose of damping vibrations of this assembly a dashpot 46 (Figs. III and IV) mounted on a bracket 47 which in turn is fastened to inwardly projecting bosses 48 of the frame 12, is provided. A plunger of this dashpot is connected at 49 to a horizontally extending arm 50 of the vertically disposed frame 27. Since its function is well known, no further description is necessary. So that the cradle, and its oscillating system upon which it is supported, may be statically balanced ribs of this beam 21 form an annulus 51 in which a cylindrical member 52 is positioned in such a manner that its center of mass may be raised and lowered to shift the center of mass of the system. Lock screws 53 are provided so that this member 52 may be locked in adjusted position. To aid in establishing the balance of this system a threaded rod 54 is studded into the member 52 so that it projects horizontally and two weights 55 are adjustably positioned thereon. By turning the weights against each other after adjustment they will be securely locked in position in the well known manner. Similar weights 55a are mounted upon a threaded stem 54a which is studded into a horizontally extending web 63 of the cradle 30 for a similar purpose.

The cradle 30, which is substantially in the shape of an obtuse V, is provided with two angularly positioned bosses 56 and 57 which are so located that planes passing through their centers bisect each other and a horizontal plane which passes through the points of engagement of the pivots 29, 31 and bearings 28 and 32 substantially at a point midway between the pivots 29 and 31. Mandrel supports 59 and 60, each of which has a threaded body, pass freely through apertures in the bosses and may be adjusted and locked therein by means of lock nuts 61 so that the longitudinal axis of a propeller mandrel 58, adapted to rest on these mandrel supports, is located directly in the intersection of the aforementioned planes.

The mechanism so far described is the same for both supporting stands 10 and 11. The stand 10, however, contains additional mechanism for indicating when the oscillating beam system is in balance and it is also provided with means for quantitatively determining an unbalance of the system when a propeller 62, mounted upon the mandrel 58, is resting in the cradles. To obtain the first mentioned indication a transversely extending web 63 (Fig. VI) has secured thereto a horizontally extending arm 64 having a bifurcated end in which a pivot 65 is positioned with its edge collinear to the edges of the pivots 29. This pivot engages a suitable bearing in a stirrup 66 suspended from a connecting rod 67 whose upper end, provided with a stirrup 68, engages a pivot 69 in the power arm of a pendulum 70. The pendulum 70, by means of a fulcrum pivot 71, is mounted in a suitable bearing in the interior of a housing 72 which surmounts the stand 10 and an indicator 73, secured to the pendulum 70, cooperates with an indicium 74 on a chart 75, which is fixed in the housing 72 to show the condition of balance of the system.

To quantitatively determine the amount of unbalance of a propeller mounted on the cradles 30, the cradle 30 in the stand 10 has two arms 76 and 77 (Fig. VI) which penetrate the walls of the frame 12 and to their vertical faces is fastened a substantially U-shaped frame 78.

The outer ends of the arms of the U frame support a micrometer screw 79 on which a poise 80 is threaded. This poise 80 is provided with a series of circumferentially extending indicia 81. These indicia cooperate with an index formed by an edge of a plate 82 fastened to the upper edges of the aforementioned arms of the U-shaped bracket 78. The upper face of the plate 82 is also provided with a series 83 of indicium. The operation of poises of this type is well known in the art and a detailed description is deemed unnecessary.

To enable the operator to lock the oscillating systems in the supports 10 and 11, each of the supports is provided with a bored hole in which a shaft 84 is seated (Fig. VI). To the inner end of the shaft 84 is fastened a cam-like member 85 which extends between two horizontally extending spaced bosses 86 on the cradle 30, as indicated by the dotted line in Fig. III. The outer end of the shaft 84 is provided with a crank handle 87. The cam-like member 85, which is substantially oval in shape, is adapted when the handle 87 is turned in an anticlockwise direction to engage the inner faces of the bosses 86 and hold the oscillating system stationarily and when turned through an angle of 90 degrees to provide sufficient clearance so that it may oscillate.

Since it is an object of the invention to lift the mandrel 58 from its seat on the cradles 30 when the propeller is turned in the balancing operation the front of the stand 10 is provided with a boss 88 in which is seated a short shaft 89 having a sprocket 90 pinned on its end in the interior of the stand, its outer end is fixed in a hand wheel 91. This sprocket 90 is engaged by an endless roller chain 92 which also engages a sprocket 93 fixed on the end of a worm gear shaft 94, one end of which is supported in a bearing stand 95 bolted to a structural steel channel 96 which in turn is secured to the bottom of a tunnel-like opening 97 underneath the floor upon which the balancing and testing device is mounted. The opposite end of the shaft 94 extends into a cast housing 98 mounted upon the opposite end of the structural steel channel 96 and upon that portion which is in the interior of this housing 98 there is keyed a worm gear 99 whose teeth engage the teeth of a gear 100 (Fig. II) pinned to a shaft 101 extending at right angles to the shaft 94, in a transversely extending branch of the tunnel-like opening beneath the floor. The opposite end of the shaft 101 is mounted in a bearing stand 102. Crank arms 103, which are also keyed to the shaft 101, pivotally engage clevises 104 fixed to the ends of connecting rods 105 extending parallelly to the worm gear shaft 94 and clevises 106 on the other ends of the rods 105 pivotally engage the lower ends of lifting cranks 107 which are pivoted on shafts 108 to fulcrum brackets 109 secured to the underside of the plates 16 in the stands 10 and 11.

An angularly extending arm 110 of the lifting crank 107 is pivotally connected by means of a pin 111 to the lower end of a vertically extending shaft 112 guided in openings in the plates 16 and the sloping shoulders of the frames 12. To the upper ends of these shafts 112, which extend through the aforementioned sloping shoulders, is fastened a cast bracket 113 in which a pair of rollers 114 are mounted on pins 115. The shafts 112 and the rollers 114 are so positioned and aligned that when a mandrel 58 is resting on the mandrel supports 59 and 60 in the cradles

30, upward movement of the shafts 112 will raise the mandrel 58 vertically from the aforementioned mandrel supports without subjecting it to forces which have sidewise components.

Assuming that the oscillating systems in the supports 10 and 11 are properly balanced, the poise 80 is in its zero position and the indicator 73 in registration with the zero indicium 74 on the chart 75, the operator for the first step in performing a balancing operation will turn the handles 87 so that the cams 85 will lock the cradles 30 and then by turning the hand wheel 91 in a clockwise direction and the worm gear 99, through the cooperation of the gear 100, rotates the shaft 101 and the crank arms 103 keyed thereto causing a "pull" to be exerted, through the rods 105, on the cranks 107. This "pull" rocks these cranks 107 about their fulcrums 108 and the arms 110, which partake of this rocking movement, raise the shafts 112 until the rollers 114 in the brackets 113, fixed to the upper ends of the shafts 112, project above the mandrel supports 59 and 60 in the cradles 30. The mandrel 58, upon which the propeller 62 is mounted, is then deposited on the rollers 114. By turning the hand wheel 91 in the opposite direction the operator now lowers this mandrel 58 until it rests on the mandrel supports 59 and 60 in the cradles 30. It is obvious that by these means the propellers, which are comparatively heavy, are gently lowered on the cradles without exerting any reactive influence on the bearings of the oscillating systems and thus injuring their knife edges. By turning the handles 87 in the opposite direction the operator then unlocks the cradles permitting the systems to oscillate.

It will readily be seen that since the cradles 30 are pivotally supported on each side of the fulcrum of the beam 21 by the frames 27 and 33 and these are parallelly guided by the check links 35 and 36 their oscillation is identical with the oscillation of the beam about its fulcrum pivot and a propeller assembly placed on the cradle, whose center of gravity is not in the longitudinal axis of the mandrel upon which it is mounted, will cause that side of the beam 21 to rock downwardly upon which the center of gravity is acting.

In this example the operator, after unlocking the cradle, notes the relative position of the indicator 73 and the zero indicium on the chart 75. If these are in registration with each other the center of gravity of the propeller is in its proper location; no further work need be done and the assembly may be removed after locking the cradle and raising the mandrel in the manner described.

If, however, an unbalanced condition is indicated, the operator rotates the propeller, while resting on the rollers 114, until the heavy portion of the assembly is on that side of the beam fulcrum which is opposite its connection to the pendulum 70 and moves the poise 80 along the micrometer screw 79 until the indicator registers with the zero indicium 74 on the chart 75. The poise indicates quantitatively the amount of unbalance in inch-pounds. The operator then rotates the propeller, while resting in the rollers 114, step by step to different positions until the position is found which indicates the greatest amount of unbalance. Correction can then be made by removing metal, or in any other desired manner, until accurate balance is obtained.

The embodiment of the invention herein shown and described is to be regarded as illustrative only, and it is to be understood that the invention is susceptible to variation, modification and change within the spirit and scope of the subjoined claims.

Having described the invention, I claim:

1. In a device for statically balancing an assembled airplane propeller, in combination, a pair of spaced, aligned stands adapted to be secured to a floor, an independent oscillating beam system in each of said stands including means for supporting one end of a mandrel of an assembled airplane propeller, a pendulated indicator operatively connected to one of said oscillating beam systems for indicating the condition of static balance of such propeller when an end of said mandrel is resting on each of said supports, a micrometer poise secured to one of said oscillating beam systems for quantitatively determining an amount of static unbalance of such propeller, a crank member pivotally mounted in each of said supports and having one of its arms depending below such floor, a vertically extending shaft in each of said supports in pivotal engagement with another arm of said crank member, means including gearing below such floor and connecting said depending crank arms and means including a hand wheel for actuating said gearing for simultaneously rocking said crank members and raising said vertically extending shafts into engagement with such mandrel.

2. In a device for statically balancing assembled airplane propellers, in combination, a pair of spaced, aligned stands, an oscillating beam system mounted in each of said stands including means for supporting a mandrel of an assembled airplane propeller, means for indicating the condition of static balance of such propeller when such mandrel is resting on said supports, means for quantitatively determining an amount of static unbalance of such propeller, manually actuated means positioned closely adjacent said mandrel supporting means for raising and lowering such mandrel in a vertical plane, said means for raising and lowering such mandrel including vertically extending shafts, brackets secured to said shafts and a plurality of rollers rotatively positioned in each of said brackets and adapted to engage and support such mandrel and means in each of said stands for locking its oscillating beam system, said means comprising spaced extending bosses on said mandrel supporting means and a member adapted to engage faces of said extending bosses when manually rotated.

3. In a device for statically balancing assembled airplane propellers, in combination, a pair of spaced, aligned stands, an oscillating beam system in each of said stands including means for supporting a mandrel of an assembled airplane propeller, means for indicating the condition of static balance of such propeller when such mandrel is resting on said supports, means for quantitatively determining an amount of static unbalance of such propeller, manually actuated means positioned closely adjacent said mandrel supporting means for raising and lowering such mandrel in a vertical plane and said means for raising and lowering such mandrel including vertically extending shafts, brackets secured to said shafts and a plurality of rollers rotatively positioned in each of said brackets and adapted to engage and support such mandrel.

4. In a device for statically balancing assembled airplane propellers, in combination, a pair of spaced, aligned stands, an oscillating beam system in each of said stands including means for supporting a mandrel of an assembled airplane propeller, means for indicating the condition of static balance of such propeller when such mandrel is resting on said supports, means for quantitatively determining an amount of static unbalance of such propeller and manually actuated rollers positioned closely adjacent said mandrel supporting means for raising and lowering such mandrel in a vertical plane and thereby disengaging and re-engaging such mandrel and said supporting means, said rollers facilitating turning of said mandrel when disengaged from said supporting means.

5. In a device for statically balancing airplane propellers, in combination, a pair of spaced stands, a beam oscillatably mounted in each of said stands, a cradle for the reception of a propeller pivotally supported from each of said beams, means for maintaining the position of said cradles in relation to said beams, a pendulated indicator operatively connected to one of said beams, a chart bearing an indicium positioned adjacent said indicator for cooperation therewith to indicate the condition of balance of said beams and cradles, a counterbalancing means secured to one of said cradles for quantitatively determining the amount of unbalance, said counterbalancing means comprising a graduated member and a poise movable therealong, means for locking said cradles against movement and manually actuated rollers for vertically raising and lowering said propeller from and to said cradles and thereby disengaging and re-engaging such mandrel and said supporting means, said rollers facilitating turning of said mandrel when disengaged from said supporting means.

6. In a device for statically balancing airplane propellers, in combination, a pair of spaced stands, a beam oscillatably mounted in each of said stands, a cradle for the reception of a propeller pivotally supported from each of said beams, means for maintaining the position of said cradles in relation to said beams, a pendulated indicator operatively connected to one of said beams, a chart bearing an indicium positioned adjacent said indicator for cooperation therewith to indicate the condition of balance of said beams and cradles, a counterbalancing means secured to one of said cradles for quantitatively determining the amount of unbalance, said counterbalancing means comprising a graduated member and a poise movable therealong, means for locking said cradles against movement, manually actuated means for vertically raising and lowering said propeller from and to said cradles and said means including a hand wheel, gearing, a pair of shafts mounted for vertical movement and cranks actuated by said gearing for raising or lowering said shafts.

7. In a device for statically balancing airplane propellers, in combination, a pair of spaced stands, a beam oscillatably mounted in each of said stands, a cradle for the reception of a propeller pivotally supported from each of said beams, means for maintaining the position of said cradles in relation to said beams, a pendulated indicator operatively connected to one of said beams, a chart bearing an indicium positioned adjacent said indicator for cooperation therewith to indicate the condition of balance of said beams and cradles and a counterbalancing means secured to one of said cradles for quantitatively determining the amount of such unbalance, said counterbalancing means comprising a graduated member and a poise movable therealong.

8. In a device for statically balancing airplane propellers, in combination, a pair of spaced stands, a beam oscillatably mounted in each of said stands, a cradle for the reception of a propeller pivotally supported from each of said beams, means for maintaining the position of said cradles in relation to said beams, a pendulated indicator operatively connected to one of said beams, a chart bearing an indicium positioned adjacent said indicator for cooperation therewith to indicate the condition of balance of said beams and cradles, a counterbalancing means secured to one of said cradles for quantitatively determining the amount of such unbalance, said counterbalancing means comprising a graduated member and a poise movable therealong, and means for locking said cradles against movement, said locking means comprising spaced projections on said cradles and rotatable means positioned in said stands adapted to be manually rotated into engagement with said spaced projections on said cradles.

9. In a device for statically balancing an assembled airplane propeller, the subcombination of a stand, a bearing in said stand, a two-armed beam having a fulcrum pivot supported in said bearing, a vertically positioned frame pivotally supported upon each arm of said beam, said vertically positioned frames having bearings in their upper ends, a cradle, knife edged pivots in said cradle adapted to engage said bearings in said frames to support said cradle parallel to said beam, check links extending between said stand and one of said vertically positioned frames for maintaining such relative position of said cradle and said cradle having propeller mandrel supports adjustable in planes which bisect each other and the plane of the edges of said pivots in said cradle.

HALVOR O. HEM.